United States Patent
Lipman et al.

[11] Patent Number: 6,104,845
[45] Date of Patent: Aug. 15, 2000

[54] HAND-HELD SCANNER WITH ROTARY POSITION DETECTOR

[75] Inventors: Adi Lipman; Aharon Lipman, both of Michmoret, Israel

[73] Assignee: Wizcom Technologies Ltd., Jerusalem, Israel

[21] Appl. No.: 08/973,911

[22] PCT Filed: Jun. 20, 1996

[86] PCT No.: PCT/IL96/00024

§ 371 Date: May 28, 1999

§ 102(e) Date: May 28, 1999

[87] PCT Pub. No.: WO97/01827

PCT Pub. Date: Jan. 16, 1997

[30] Foreign Application Priority Data

Jun. 27, 1995 [IL] Israel ......................................... 114367

[51] Int. Cl.[7] .............................. G06K 9/22; G06K 7/10; H04N 1/024
[52] U.S. Cl. ...................... 382/313; 358/473; 235/472.01
[58] Field of Search .................... 382/313, 314, 382/321, 323, 140; 235/462, 472, 454; 250/234, 566; 358/673

[56] References Cited

U.S. PATENT DOCUMENTS

| | | | |
|---|---|---|---|
| 3,541,248 | 11/1970 | Young | 382/313 |
| 3,632,877 | 1/1972 | Gray | 179/18 A |
| 3,644,714 | 2/1972 | Phillips et al. | 235/61.11 E |
| 3,655,921 | 4/1972 | Busick et al. | 179/18 ET |
| 3,676,938 | 7/1972 | Trehub | 250/555 |
| 3,757,320 | 9/1973 | Heath | 340/336 |
| 3,867,572 | 2/1975 | Taplin et al. | 178/76 |
| 3,869,599 | 3/1975 | Sansone | 382/313 |
| 3,918,028 | 11/1975 | Humphrey | 340/146.3 F |
| 3,932,859 | 1/1976 | Kyriakides et al. | 340/324 R |
| 3,949,329 | 4/1976 | Martin | 333/84 L |
| 4,034,155 | 7/1977 | Muller | 382/314 |
| 4,139,898 | 2/1979 | Tanaka | 364/900 |
| 4,158,236 | 6/1979 | Levy | 364/900 |
| 4,159,536 | 6/1979 | Kehoe et al. | 364/900 |
| 4,393,460 | 7/1983 | Masuzawa | 364/900 |
| 4,393,462 | 7/1983 | Tanimoto | 364/900 |
| 4,523,235 | 6/1985 | Rajchman | 358/256 |

(List continued on next page.)

FOREIGN PATENT DOCUMENTS

| | | | |
|---|---|---|---|
| 52-061944 | 5/1977 | Japan | G06F 15/40 |
| 52-086748 | 7/1977 | Japan | G06F 15/38 |
| 52-137951 | 11/1977 | Japan | G06F 15/40 |
| 54-043628 | 4/1979 | Japan . | |
| 54-078042 | 6/1979 | Japan | G06F 15/38 |
| 54-092146 | 7/1979 | Japan | G06F 7/28 |
| 54-107244 | 8/1979 | Japan | G06F 15/38 |
| 54-107245 | 8/1979 | Japan | G06F 15/38 |
| 54-139355 | 10/1979 | Japan | G06F 15/38 |
| 59-35279 | 2/1984 | Japan | G06K 9/00 |
| 60-20285 | 1/1994 | Japan | G06F 15/38 |
| 60-83462 | 3/1994 | Japan | G05D 23/19 |
| WO 9410652 | 5/1994 | WIPO | G06K 9/22 |

OTHER PUBLICATIONS

Manual for a japanese Scanner Aparatus, Purchased in 1996.

*Primary Examiner*—Thomas D. Lee
*Assistant Examiner*—Wenpeng Chen
*Attorney, Agent, or Firm*—Helfgott & Karas, P.C.

[57] ABSTRACT

An optical scanner including a hand-holdable housing including a scanner head for scanning a record medium, a roller engageable with and rotatable by the record medium when scanned by the scanner head, the roller including an optically-sensible marking for use in measuring rotary movements of the roller, a light source illuminating the roller and the marking thereof, an optical sensor for sensing information on the record medium and the marking of the roller, and a control system for periodically energizing the light source during predetermined time periods enabling the optical sensor to sense the marking of the roller during the predetermined time periods, and the information on the record medium during other time periods.

26 Claims, 13 Drawing Sheets

U.S. PATENT DOCUMENTS

| | | | |
|---|---|---|---|
| 4,542,526 | 9/1985 | Satoh | 382/313 |
| 4,553,035 | 11/1985 | Malinsky | 382/313 |
| 4,574,317 | 3/1986 | Scheible | 382/313 |
| 4,639,790 | 1/1987 | Kusaka | 358/293 |
| 4,703,186 | 10/1987 | Nakayama | 250/566 |
| 4,780,707 | 10/1988 | Selker | 340/710 |
| 4,793,812 | 12/1988 | Sussman | 235/472 |
| 4,797,544 | 1/1989 | Montgomery | 382/313 |
| 4,809,351 | 2/1989 | Abramovitz | 382/313 |
| 4,818,978 | 4/1989 | Kurihara | 358/294 |
| 4,887,165 | 12/1989 | Sato | 358/474 |
| 4,890,230 | 12/1989 | Tanoshima | 364/419 |
| 4,930,848 | 6/1990 | Knowles | 235/462.45 |
| 4,947,261 | 8/1990 | Ishikawa | 358/473 |
| 4,959,871 | 9/1990 | Mori | 382/313 |
| 4,984,177 | 1/1991 | Rondel | 364/419 |
| 4,996,707 | 2/1991 | O'Malley | 379/100 |
| 5,003,193 | 3/1991 | Yatsuzuka | 382/313 |
| 5,022,086 | 6/1991 | Crane | 382/314 |
| 5,059,778 | 10/1991 | Zouzoulas | 235/472 |
| 5,062,047 | 10/1991 | Tanaka | 364/419 |
| 5,063,508 | 11/1991 | Yamada | 382/313 |
| 5,115,227 | 5/1992 | Keiji | 382/313 |
| 5,157,606 | 10/1992 | Nagashima | 364/419 |
| 5,175,422 | 12/1992 | Koizumi | 235/472 |
| 5,301,243 | 4/1994 | Olschafskie | 382/313 |
| 5,430,558 | 7/1995 | Sohaei | 358/473 |
| 5,574,804 | 11/1996 | Olschafkie et al. | 382/314 |
| 5,974,204 | 10/1999 | Lin et al. | 382/314 |

HAND-HELD SCANNER WITH ROTARY POSITION DETECTOR

FIELD AND BACKGROUND OF THE INVENTION

The present invention relates to hand-holdable optical scanners for scanning record media, and also to a rotary encoder useful in such scanners. The invention is particularly useful in a scanner-type electronic translator for scanning printed texts on record media and for simultaneously translating the words from one language into another language, or from one definition to another definition in the same language.

Hand-holdable optical scanners have come into widespread use for a number of applications, such as for bar-code readers at points-of-sale of products and/or services, for recording data appearing on original documents for later reproduction or processing, and for translating documents. Examples of optical scanners for the latter applications are described in U.S. Pat. Nos. 4,393,460, 4,523,235, 4,639,790, 4,890,230, 4,947,261, 4,959,871, 5,063,508 and 5,301,243.

OBJECTS AND BRIEF SUMMARY OF THE INVENTION

One object of the present invention is to provide a hand-holdable optical scanner of a very compact construction which makes it particularly useful as an electronic translator. Another object of the invention is to provide a rotary movement detector, or rotary encoder, particularly useful in such a hand-holdable optical scanner but also useful in other rotary encoder applications.

According to one aspect of the present invention, there is provided an optical scanner comprising a hand-holdable housing including: a scanner head for scanning a record medium; a roller engageable with and rotatable by the record medium when scanned by the scanner head, the roller including an optically-sensible marking for use in measuring the rotary movements of the roller; a light source illuminating the roller and the marking thereof; an optical sensor for sensing information on the record medium and the marking of the roller; and a control system for periodically energizing the light source during predetermined time periods enabling the optical sensor to sense the marking of the roller during the predetermined time periods, and the information on the record medium during other time periods.

Such an arrangement enables the scanner to be of a very compact construction since it permits the optical sensor to be used, in a time sharing manner, both for sensing the informational data on the record member and for tracking the movements of the scanner. The scanner movements thus generate address data for storing and processing the sensed informational data.

According to another aspect of the present invention, there is provided a detector particularly useful in an optical scanner for detecting the rotary movements of a roller in the scanner, but also useful in other rotary-encoder applications for detecting the rotary movements of a rotary member, such as a rotary shaft. The novel detector comprises: a linear array of optical sensor elements extending parallel to the rotary axis of the rotary member; a light source for illuminating the outer surface of the rotary member; and an optically-sensible marking including at least one line extending helically on the outer face of the rotary member.

Further features and advantages of the invention will be apparent from the description below.

BRIEF DESCRIPTION OF THE DRAWINGS

The invention is herein described, by way of example only, with reference to the accompanying drawings, wherein:

FIGS. 5 and 6 are diagrams helpful in explaining the operation of the position detector system including the roller of FIGS. 4 and 4a;

DESCRIPTION OF PREFERRED EMBODIMENTS

Overall Construction

Figure 1:
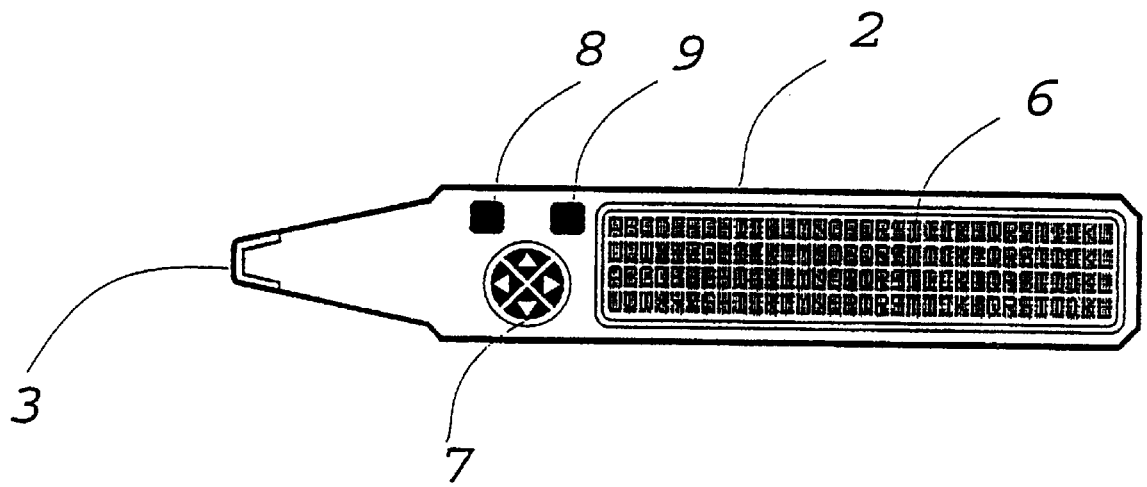
FIG. 1 is a pictorial illustration of one form of hand-holdable optical scanner constructed as an electronic translator in accordance with the present invention.
Figure 2:
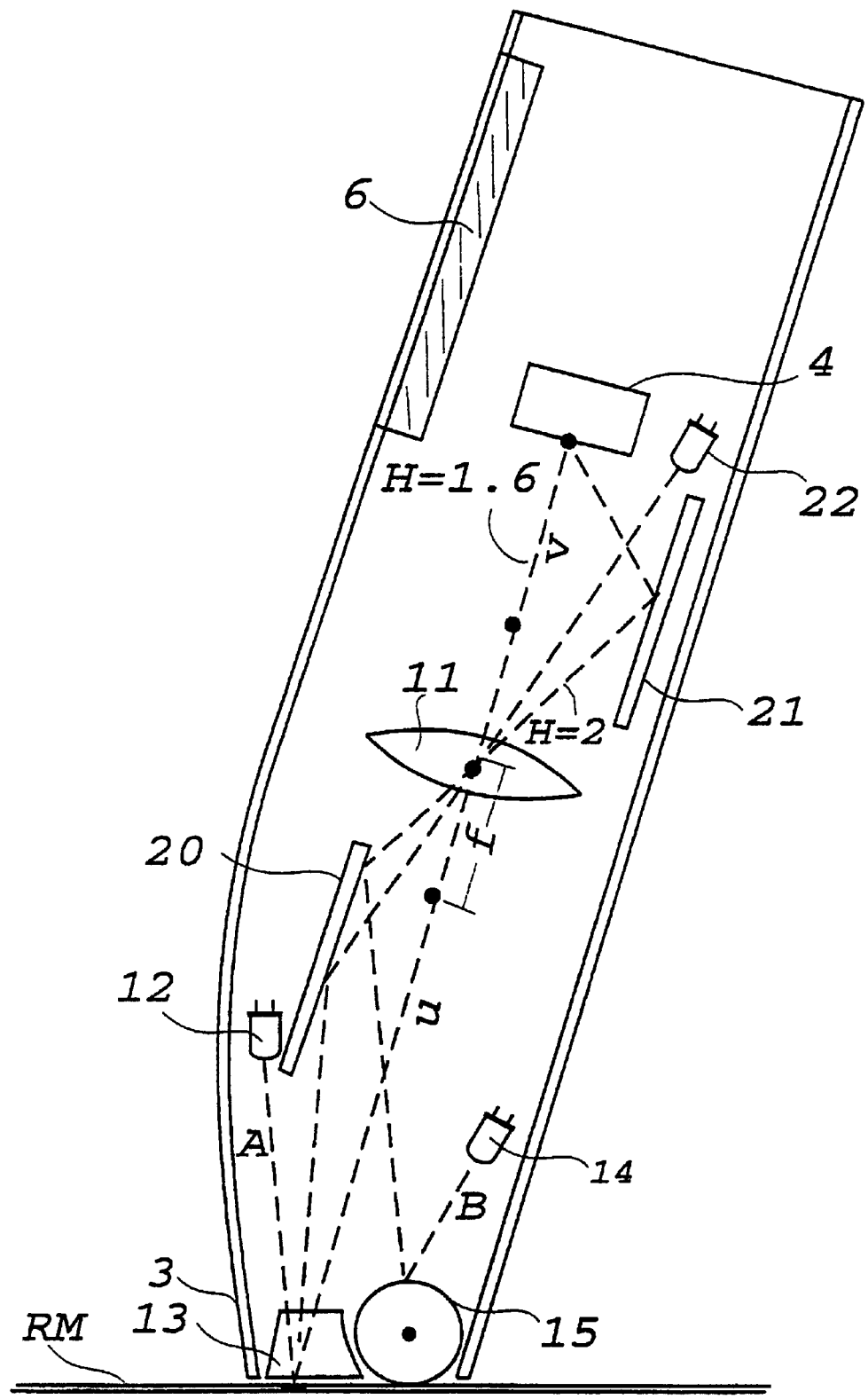
FIGS. 2 and 3 are side and front diagrammatical views, respectively, more particularly illustrating the internal construction of the scanner of FIG. 1.
Figure 3:
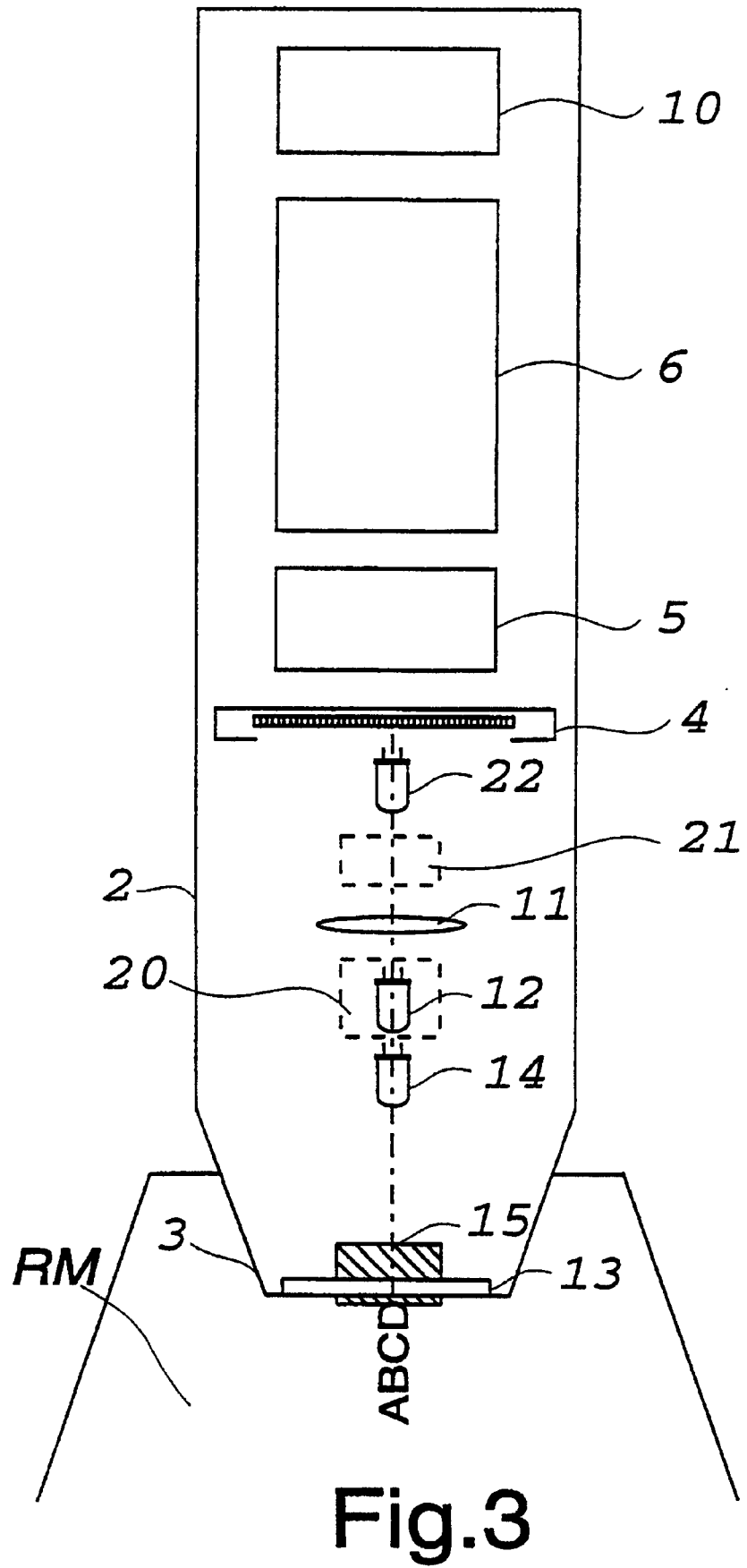

The electronic translator illustrated in FIGS. 1–3 of the drawings comprises a hand-holdable housing 2 including a scanner head 3 at one end for scanning a record medium, such as a printed text. An optical sensor 4 is enclosed within housing 2 for sensing characters printed on a record medium RM scanned by the scanner head 3 and for converting them to electrical signals. Housing 2 also contains electrical circuitry, indicated by block 5 in FIG. 3, which includes a storage device for storing a dictionary of words in one language and their translations in another language. Housing 2 further carries a visual display 6 for displaying the translations of scanned words. Electrical circuitry 5 within the housing includes, in addition to the mentioned storage device, also a data processor for processing the electrical signals from the optical sensor 4, for recognizing words therefrom corresponding to words stored in the storage device, and for displaying their translations in the visual display 6.

Housing 2 further includes four directional keys, generally designated 7, for centering the words reproduced on the visual display 6; an ON/OFF key 8 for energizing the scanner and for deenergizing it; and an Enter key 9 for entering a word. Enter key 9 may also function as a Continuation key, to be depressed when a word on one line is continued on a second line. The four directional keys 7 may be used for centering the words reproduced in the visual display 6, such that after a scanned word is centered in the display, the Enter key 9 is depressed to display the translation. Keys 7 may also be used for moving a cursor to select a translation.

The scanner is powered by its own self-contained battery power supply, schematically shown at 10 in FIG. 3.

The optical sensor 4 is constituted of a plurality of optical sensing elements arranged in a linear array perpendicular to the direction of movement of the scanner head 3. In the example described below, it is a single linear CCD array of 64 pixels having a length of about 8 mm, and is used in three separate systems of the scanner: (1) a character detector system, for detecting the characters scanned by the scanner head; (2) a displacement detector system, for detecting the displacement or movement of the scanner head over the record medium; and (3) a record medium detector system, for detecting the proper positioning of the scanner head in contact with the record medium RM. The images produced by all three systems are focussed by a common focussing lens 11 on the CCD array 4.

The Character Detector System

The character detector system includes a light source 12 for projecting a beam of light onto the field of view of the record medium RM as it is scanned by the scanner head 3. This light is reflected by the record medium RM back into the housing 2 and is focussed by focussing lens 11 onto the CCD array 4. In order to prevent interference from visible light externally of the housing, light source 12 is preferably a source of infrared light, such as an IR LED, and projects its light onto the record medium RM via an IR filter 13.

The Displacement Detector System

The displacement detector system for detecting the displacement of the scanner head along the record medium RM includes a second light source 14 which projects its light onto a roller 15 engageable with the record medium RM, and rotated thereby as the scanner head 3 is moved along the record medium. Roller 15 is mounted for rotation about an axis parallel to the CCD array 4, i.e., perpendicular to the direction of movement of the scanner head 3 along the record medium RM. This roller is provided with optically discernible markings effective to reflect light from light source 14 onto the CCD array 4 corresponding to the rotary position of the roller.

Figure 4:
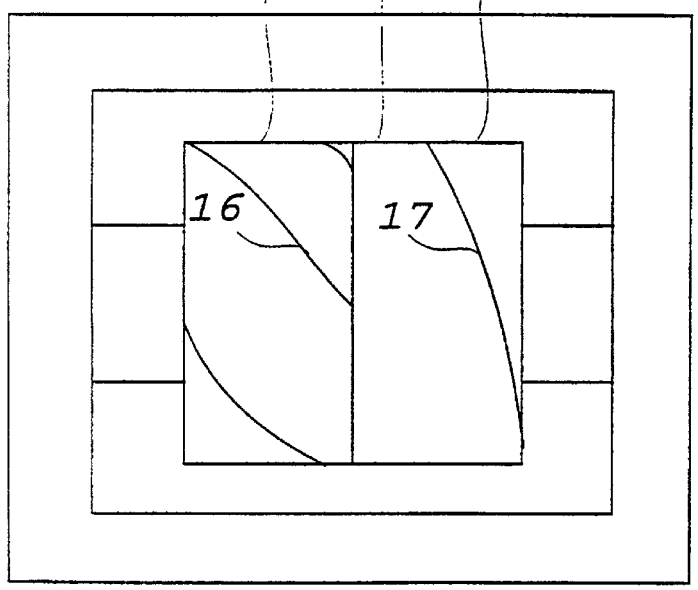
FIG. 4 is a bottom plan view illustrating the roller in the scanner of FIGS. 1–3.
Figure 4A:
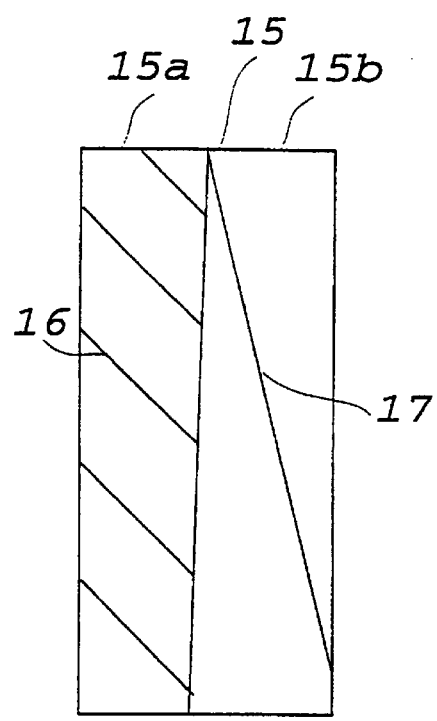
FIG. 4a is a flat projection of the outer surface of the roller of FIG. 4.

FIG. 4 is a bottom plan view illustrating roller 15, and FIG. 4a is flat projection of the outer surface of the roller. As shown in these figures, roller 15, or the middle portion thereof, is divided into a first section 15a at one end, and a second section 15b at its opposite end. Section 15a carries a plurality of lines 16 each extending helically for a fraction of the circumference of the roller and equally spaced from each other circumferentially of the roller; whereas roller section 15b includes a single line 17 extending helically around the roller. The outer surface of the roller 15 is black, but the lines 16, 17 are white (or vice versa) so as to be visually discernible.

Roller section 15a includes five such lines 16. Each extends for substantially one-fifth the circumference of the roller, preferably slightly more than one-fifth of the circumference to provide a small overlap. Helical line 17 in section 15b extends for the complete circumference of that roller section.

Figure 15:
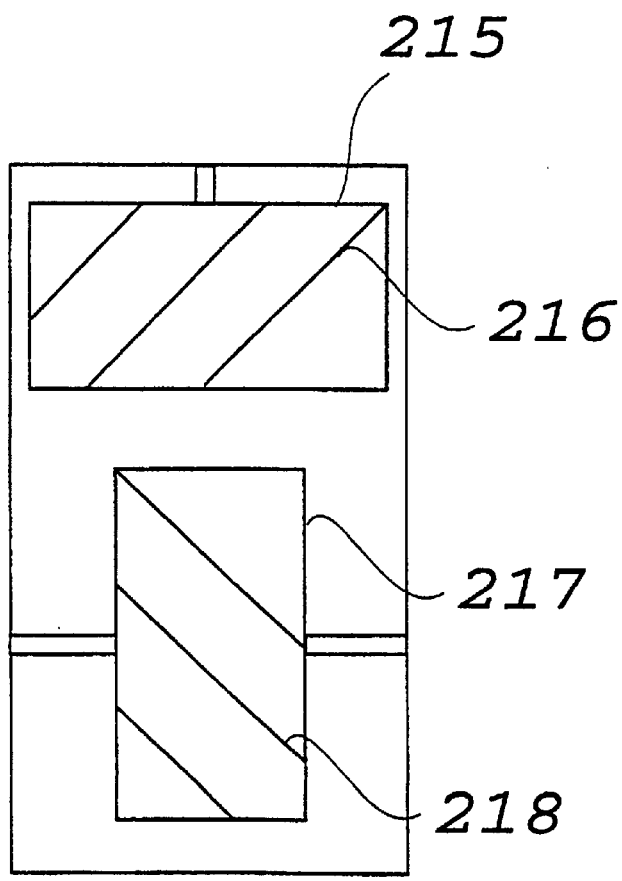
FIG. 15 illustrates another roller assembly which may be used in the displacement detector system.

Light source 14 is preferably a source of visible light. It is projected onto the outer surface of roller 15. FIG. 15 illustrates the region 18 from which the light is reflected back from roller 15 and focussed on the CCD array 4. Thus, one spot of light 18a will be reflected from one of the helical lines 16 in roller section 15a, and a second spot of light 18b will be reflected from helical line 17 in roller section 15b. As the roller rotates, the two spots of light 18a, 18b will move along the pixels of the CCD array 4 such that the pixels illuminated by these spots of light indicate the rotary position of the roller, and thereby track the displacement of the roller as the scanner head is moved across the record medium RM.

Figure 6:
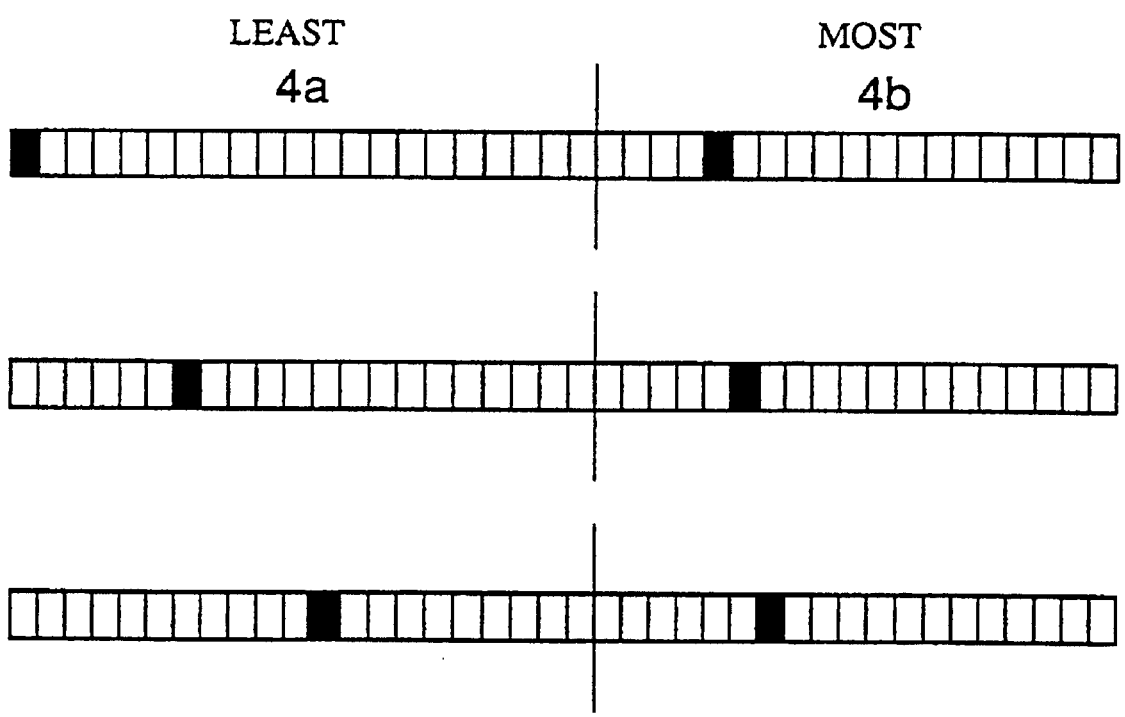

This is more particularly illustrated in FIG. 6, showing three illuminated conditions of the CCD array 4 in three different rotary positions of the rotor 15. As shown in FIG. 6, the CCD array 4 is divided into two sections, namely section 4a representing the "least significant bit" of movement of roller 15 which receives light spot 18a reflected from a helical line 16 of roller section 15a, and section 4b representing the "most significant bit" of movement of the roller which receives light spot 18b reflected from helical line 17 of roller section 15b. The combination of the most significant bit of CCD array section 4b with the least significant bit of CCD array section 4a provide a very accurate indication of the rotary position of roller 15.

Following is one example of a construction that could be used: Roller 15 may have a diameter of 1.6 mm, and a length of 4 mm divided into two equal sections 15a, 15b, each of 2 mm; thus, the circumference of the roller is approximately 5 mm. Assuming that the CCD array 4 is of a length of 8 mm and is constituted of 64 pixels, divided into the two sections 4a, 4b of 32 pixels each, it will be seen that, with five helical lines 16 in roller section 15a, one complete rotation of the roller will produce 5×32=160 steps, thereby providing a resolution of 5/160, which is approximately 30 μm.

Figure 5:
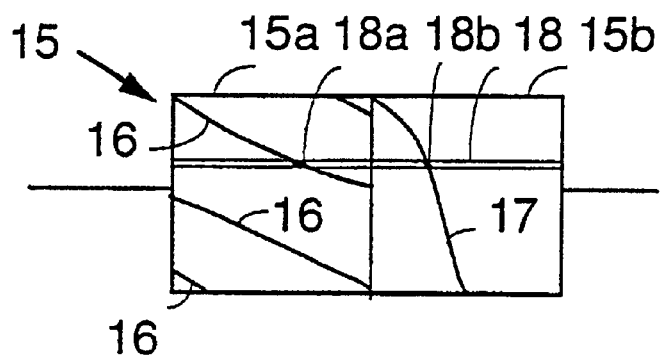

While a two-section roller is illustrated in FIGS. 4–6, a single-section roller may also be used, as described below with respect to FIG. 14. The same resolution may be attained by using 2.5 lines sensed by 64 pixels of the CCD. Either arrangement provides a very accurate measurement of the rotary position of roller 15, and thereby of the displacement of the scanner head 3 over the record medium RM, with no backlash, so that the scanner can be moved in either direction with no hysteresis.

The Optical System

As indicated earlier, the displacement detector system, which includes the visible light source 14 and the roller 15, also utilizes the same focussing lens 11 utilized by the character detector system, which includes light source 12, for focussing the light spots on the CCD array 4. The optical path of the light in the displacement detector system includes a first mirror 20 between roller 15 and focussing lens 11, and a second mirror 21 between the focussing lens and the CCD array 4. These mirrors, as well as the focussing lens 11 and the CCD array 4, are located such that:

$$1/f = 1/u + 1/v$$

wherein:
 "f" is the focal length of the focussing lens 11;
 "u" is the distance of the optical path from the object (record medium in the character detection system and the outer surface of roller 15 in the displacement detection system) to the focussing lens 11; and
 "v" is the distance of the optical path in the above two systems from the focussing lens 11 to the CCD array 4.

The height of the most common characters is in the range of 1.2–4 mm. As indicated earlier, the CCD array 4 includes a single line of 64 pixels having a total length of 8 mm. The distance ("u") of the record medium RM from the focussing lens 11, and the distance ("v") from the lens 11 to the CCD array 4, are such that the optical magnification is about 1.6; that is, the image projected onto the CCD array 4 is magnified 1.6 times. The optical magnification of the displacement detector is equal to two.

Record Medium Detector System

The record medium detector system includes a third light source 22, preferably an IR LED, which projects a beam of light via focussing lens 11, mirror 20, and the IR filter 13, to impinge the record medium RM. This light is reflected back from the record medium and is focussed by focussing lens 11 on the CCD array 4. The above relation of "u" and "v" of the optical path of this light source 22, is also as described above such that when the scanner is properly positioned with the scanner head 13 in contact with the record medium RM, the light from light source 22 is focussed to a sharp spot on the record medium and its reflection is focussed as a sharp spot on the CCD array 4, thereby providing an indication that the scanner head is properly positioned in contact with the record medium RM.

Energization of the Three Light Sources

Figure 9:
FIG. 9 is a timing diagram illustrating the operation of the character detector, displacement detector and record medium detector systems.
Figure 9:
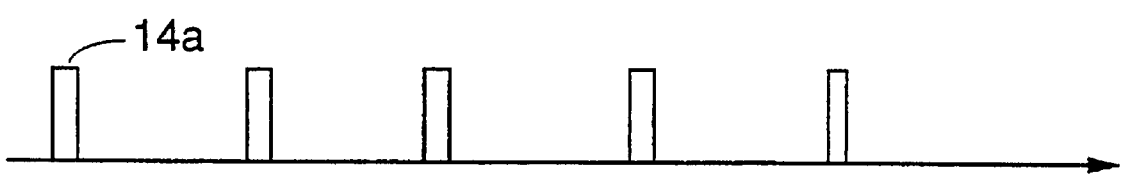
Figure 9:
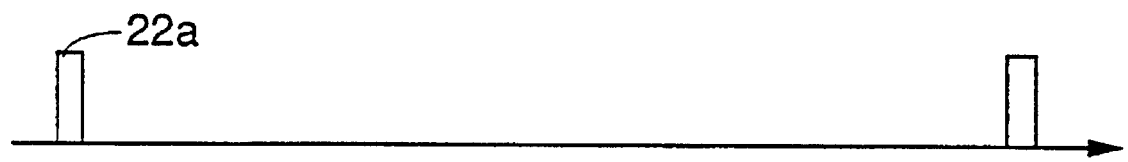

Since the same CCD array 4 is used in (a) the character detector system of light source 12, (b) the displacement detector system of light source 14, and (c) the record medium detector system of light source 22, these three light sources are energized at different time periods so as to enable the data processor to distinguish between these three detector systems with respect to the output of the CCD array 4. FIG. 9 illustrates one example of how the three light sources may be energized at different frequencies and at different phases to enable distinguishing the output of the CCD array for the three different detector systems. Thus, light source 12 for the character detector system may be pulsed at a frequency of 500 Hz as shown by pulses 12a; light source 14 for the displacement detector system may be pulsed at a higher frequency, e.g., 2 Khz; and light source 22 of the record medium detector system may be pulsed at a much lower frequency, e.g., 100 Hz, as indicated by pulses 22a.

The Overall Electrical System

Figure 7:
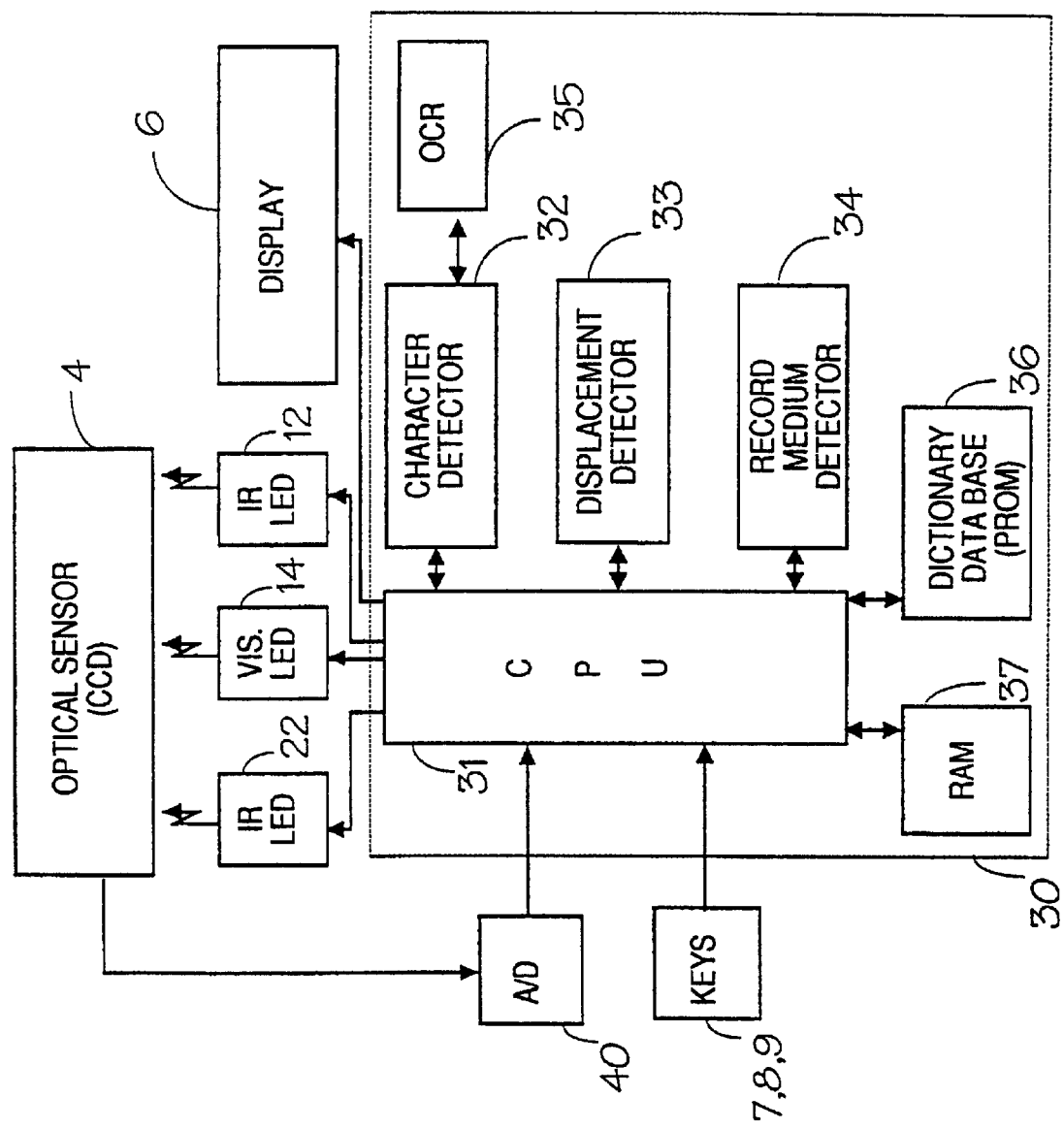
FIG. 7 is a block diagram illustrating the electrical circuit in the electronic translator of FIGS. 1–3.

FIG. 7 is a block diagram illustrating the overall electrical system in the above-described electronic translator. The electrical system includes a digital signal processor, generally designated 30, enclosed within housing 2 as schematically indicated by block 5 in FIG. 3. Processor 30 receives inputs from the CCD array optical sensor 4 after conversion to digital form by an A/D converter 40. Processor 30 includes a CPU 31, which also controls the energization of the IR light source 12 used for character detection, the visible light source 14 used for displacement detection, and the IR light source 22 used for record medium detection. These light sources are energized at different intervals and at different frequencies as described above with respect to FIG. 9. Thus, when the CPU 31 receives the output from the CCD array 4 as a result of energizing the IR light source 12, it processes the information in a character detector system 32; when it receives the CCD array output as a result of energizing the visible light source 14, it processes the information in a displacement detector system 33; and when it receives the CCD array output as a result of energizing IR light source 22, it processes the information in a record medium detector system 34.

Processor 30 also includes an optical character recognition (OCR) system 35 receiving the information processed in the character detector system 32 for recognizing characters. It further includes a PROM storage device 36 for storing, in addition to its operational program, also a dictionary of words in one language and their translations in another language. It further includes a RAM storage device 37 for use during the normal operation of the electronic translator.

Figure 16:
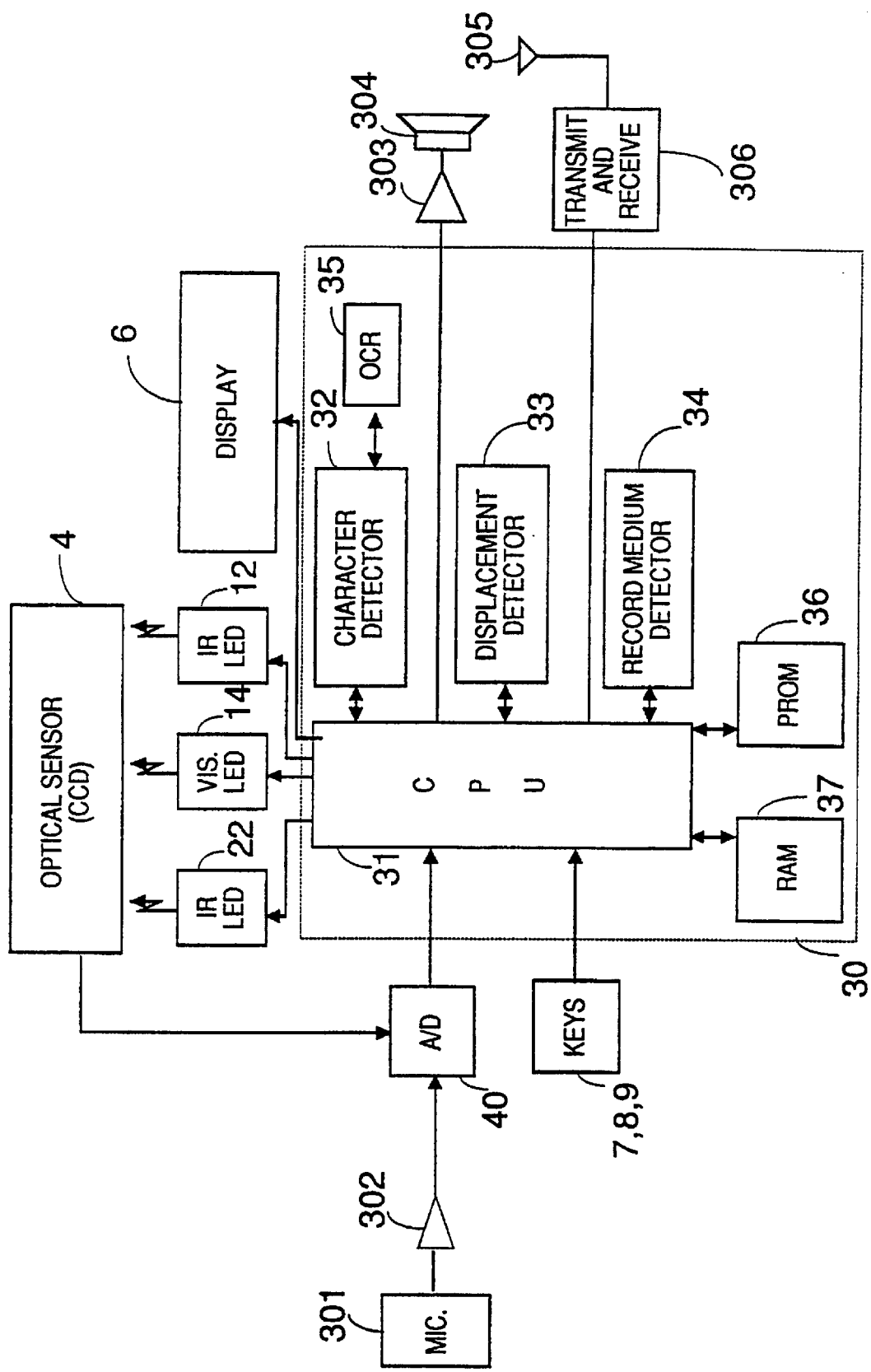
FIG. 16 is a block diagram corresponding to that of FIG. 5 but modified to include a voice input/output capability and also a space transmit/receive capability.

While the character detector system 32, the displacement detector system 33, the record medium detector system 34, and the optical character recognition (OCR) system 35 are all shown as separate blocks in FIG. 16, it will be appreciated that they are actually logic units within the data processor system 30.

The processor 30 also includes inputs from the control keys 7, 8, 9 illustrated in FIG. 1.

Overall Operation

Figure 12:
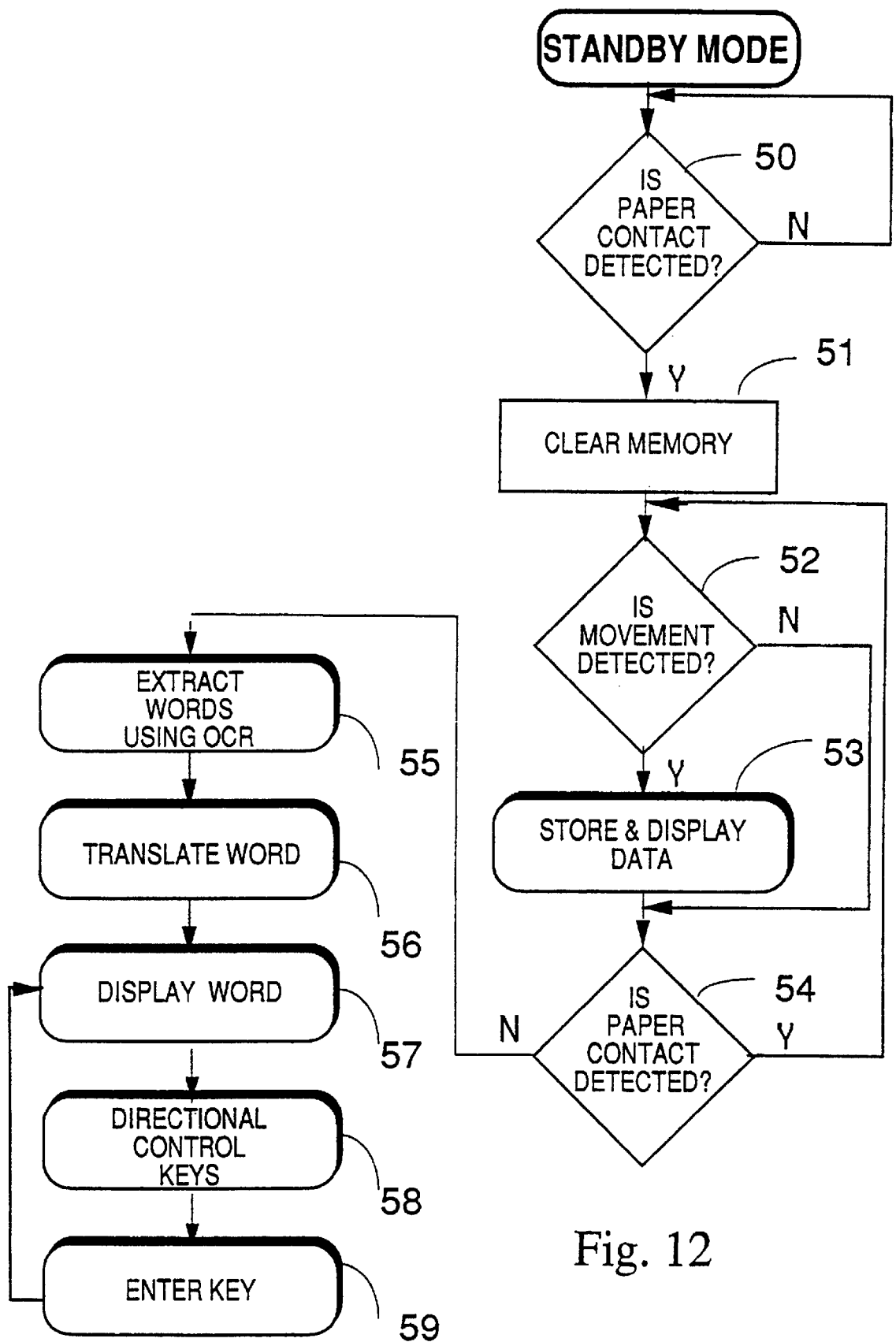
FIGS. 12 and 12a are flow charts illustrating two modes of operation of the electronic translator of FIGS. 1–3.

FIG. 12 is a flow chart illustrating the overall operation of the electronic translator.

Figure 8:
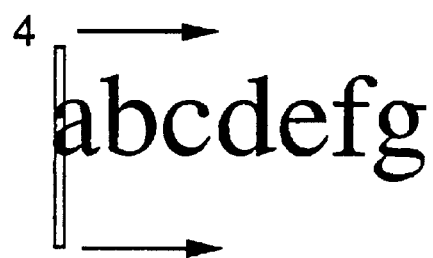
FIG. 8 illustrates the manner in which the scanner head scans the textual information on the record medium.

The user holds the scanner in one hand, presses the scanner head 3 against the record medium RM containing the text to be read, and moves the scanner head along the record medium perpendicular to the CCD linear array 4, as shown in FIG. 8.

The system first determines whether the record medium RM (FIG. 2) is properly contacted by the scanning head 3 of the scanner (block 50). This condition is determined to be present when light from light source 22, periodically energized at 100 Hz and focussed by focussing lens 11 into a small spot on the record medium RM, produces a focussed spot on the CCD array 4. When this condition has been found to be present, RAM 37 is cleared (block 51), and a determination is then made whether movement is detected between the scanner head 3 and the record medium RM (block 52). The movement of the scanner head across the record medium RM is measured by the rotation of roller 15, which rotation is indicated by the pixels of the CCD array 4 illuminated by the light spot 18a reflected from helical lines 16 of roller section 15a, and light spot 18b reflected from helical lines 17 of roller section 15b, as described above with respect to FIGS. 4–6.

During this movement of the scanner, light source 14 of the displacement detector system is energized at a frequency of 2 KHz, and light source 12 of the character detector system is energized at a frequency of 500 Hz. The readouts from the CCD array 4 are stored (block 53).

The maintenance of the scanner head in contact with the record medium is continuously checked by the fact that a small spot of light from light source 22 is periodically focussed on the CCD array 4 (block 54). All the while the scanner head is in contact with the record medium RM, the system returns to the beginning of block 52, stores and displays the words scanned during the movement of the scanner head.

When the scanner head is moved out of contact with the record medium RM, the character detector system 32 within processor 30 feeds the stored information to the OCR 35. The latter circuit recognizes the characters scanned by the scanner head and extracts the words defined by such characters from the storage device PROM 36 (box 55). It then extracts their translations from the storage device (box 56), and displays the translations in the visual display 6 (box 57).

Generally, a plurality of translations are displayed. The directional control keys 7 may then be operated to move a cursor in the display to select one of the translations (block 58), and when one has been selected, the Enter key 9 may be depressed to display a translation in the original language of the selected translated word.

Some Variations

Figure 12A:
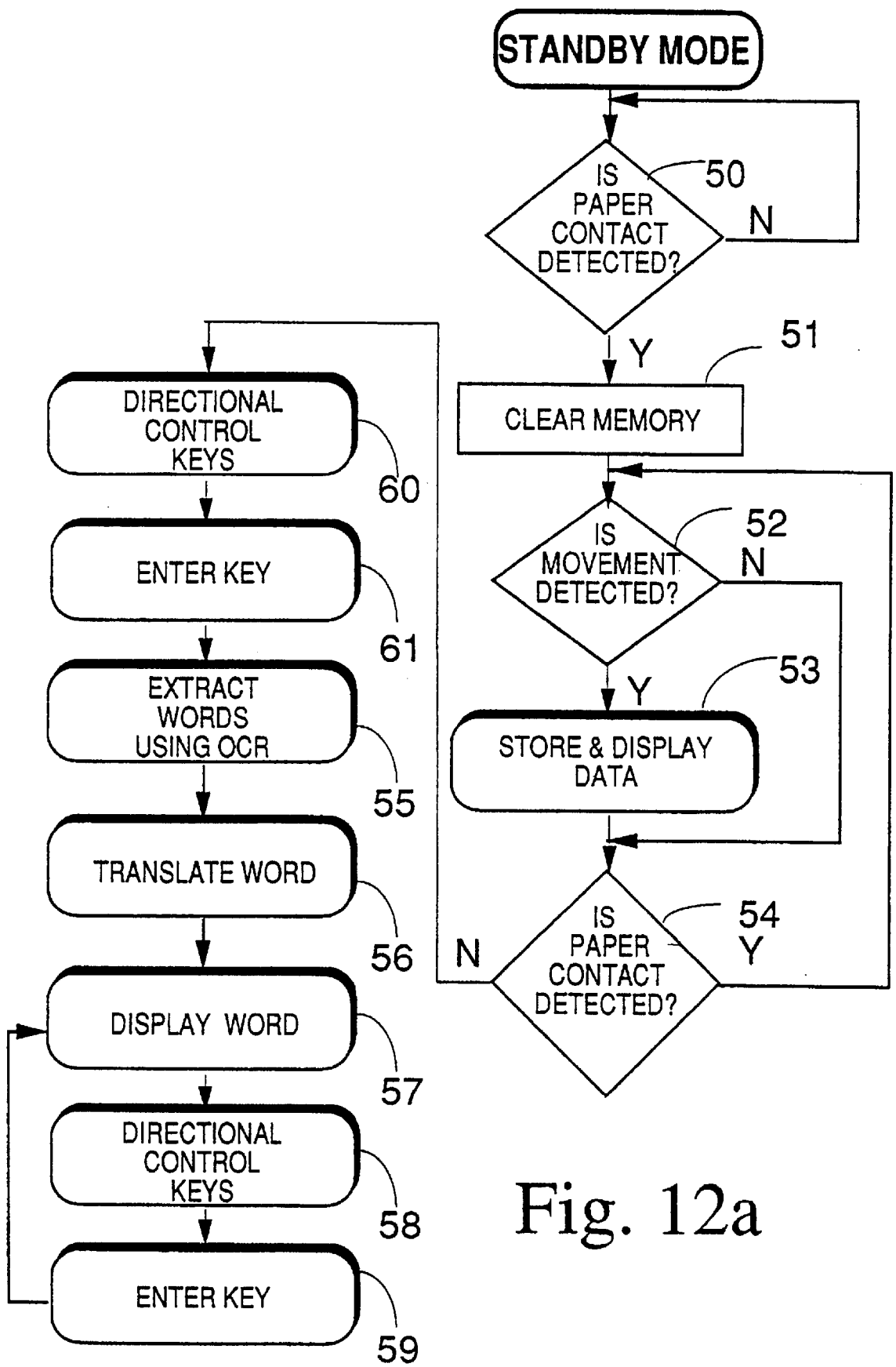

FIG. 12a illustrates a variation in this mode of operation, wherein the directional keys 7 are operated to center the translated words in the display after the scanner has left contact with the paper (block 60), and then the Enter key 9 may be depressed (block 61) to perform the operations of blocks 55–59 as described above with respect to FIG. 12.

Figure 10:
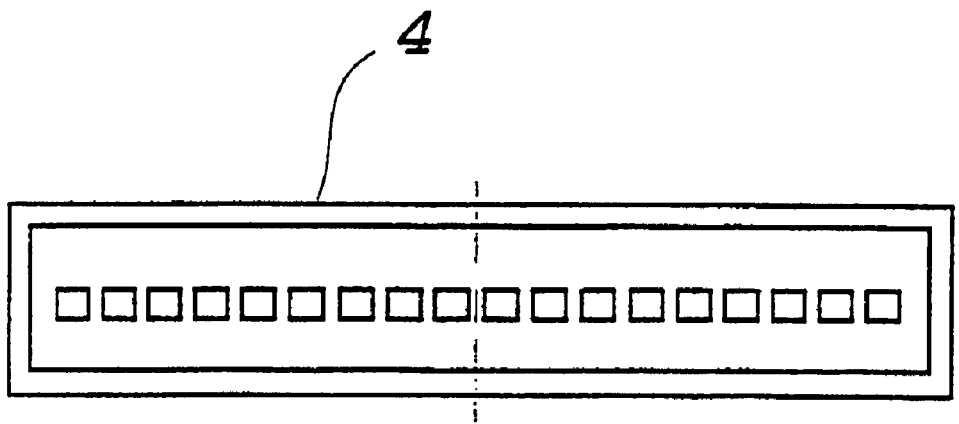
FIG. 10 illustrates one example of an array of optical sensing elements used in the electronic translator of FIGS. 1–3.
Figure 11:
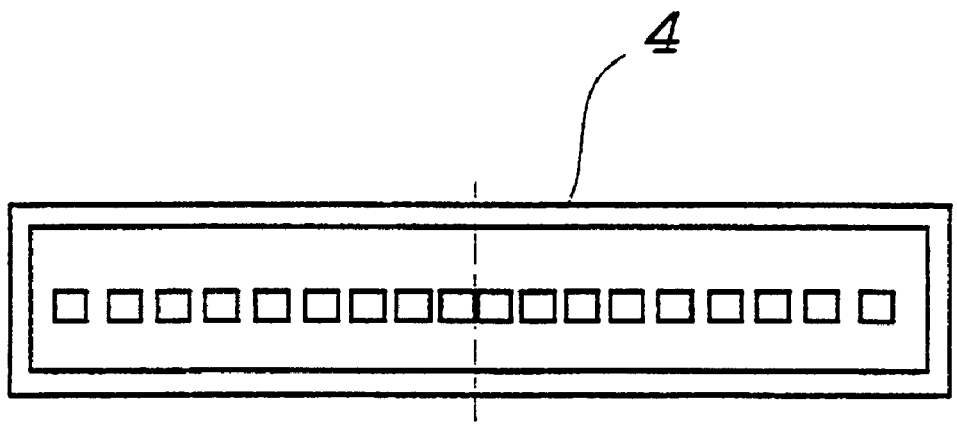
FIG. 11 illustrates another example of such an array of optical sensing elements.

FIG. 11 illustrates a variation in the CCD array 4, wherein the optical sensing elements (pixels) are not equally spaced as in FIG. 10, but rather are non-equally spaced from each other, being closer together at their center region and further apart at their ends. This configuration enables reasonable resolution with a minimum number of pixels where the characters are relatively large.

Figure 13:
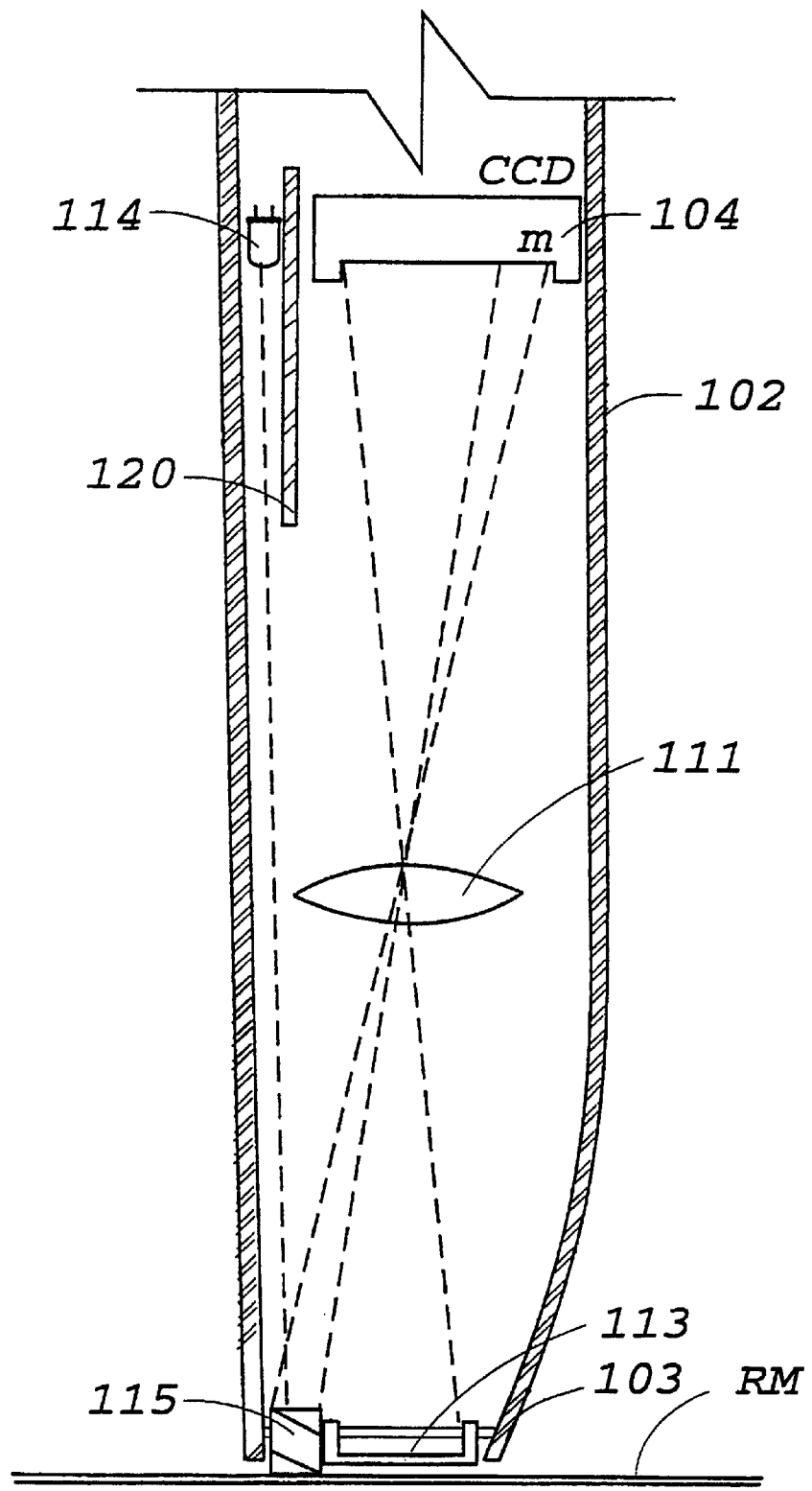
FIG. 13 illustrates a variation in the construction of the electronic translator of FIGS. 1–3.
Figure 14:
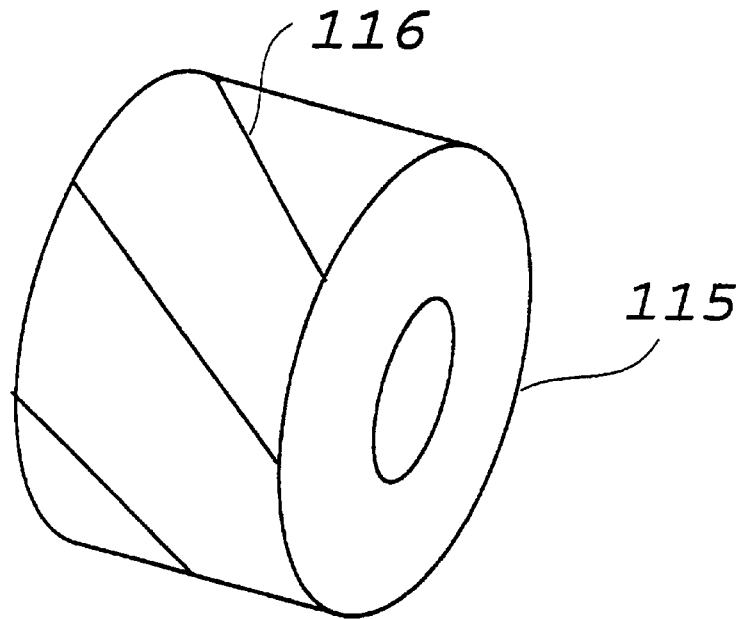
FIG. 14 illustrates the roller in the displacement detector system of the electronic translator illustrated in FIG. 13.

FIGS. 13 and 14 illustrate a variation wherein the scanner 102 does not include an IR light source (corresponding to light source 12 in FIGS. 1–5), but rather uses the external natural light for illuminating the textual information on the record medium RM. In this case, the scanner head 103 is provided with a transparent window 113 for admitting the external light from the record medium RM, which light is focussed by lens 111 on the CCD array 104.

The variation illustrated in FIGS. 13 and 14 also includes a light source 114 for illuminating a roller 115 engageable by the record medium and rotated about an axis parallel to the CCD array 104. Roller 115 in this modification, however, includes only a single section, corresponding to section 15a in the previously-described embodiment, provided with a plurality (e.g., five) white lines 116 (FIG. 14) extending helically around the roller, with each line extending only one-fifth the circumference of the roller. The position detector system of FIGS. 13 and 14 would thus be capable of measuring the small increments of movement as described above with respect to section 15a of the roller in the first-described embodiment. The light reflected from roller 115 is also foucssed by lens 111 on the CCD array 104. The scanner includes a light barrier, as shown schematically at 120, for preventing interference between the light in the position detector path from interfering with the light in the character detection path.

In the system of FIGS. 13 and 14, the images of the roller and of the character may be focussed on two different sections of the CCD array 104, in which case time-sharing of the CCD array would not be necessary. Alternatively, the output of the CCD array could be controlled such that its output is used for detecting the position of the roller during those time periods in which light source 114 is energized, and for detecting the characters during other periods.

FIG. 15 illustrates another possible variation in the scanner, particularly in the position detector system. In this variation the position detector system includes two rollers, namely one roller 215 formed with helical lines 216 and mounted for rotation parallel to the axis of the CCD array 4, and a second roller 217 also formed with helical lines 218 but mounted for rotation about an axis perpendicular to the CCD array. Each of the rollers 215 and 217 would preferably be provided with a separate light source such that the two rollers 215, 217 detect and measure the increments of movement of the scanner head along the two orthogonal axes with respect to the textual material appearing on the record medium.

FIG. 16 illustrates a further variation that may be included in the above-described electronic translator. In this variation, the electronic translator is provided with a microphone 301 and an amplifier 302 for inputting voice information into the processor 30 via the A/D converter 40. It is further provided with an amplifier 303 and a speaker 304 for outputting the translated words via the speaker. Thus, in the variation illustrated in FIG. 16, the words to be translated may not only be detected by the scanner head, but may also be spoken into the microphone 301; and the translated words may not only be outputted via the display 6, but would also be reproduced by the speaker 304.

FIG. 16 illustrates a further optional feature, namely the capability of transmitting and receiving information through space via an antenna 305 and a transmit and receive unit 306, enabling the hand-held scanner device to communicate with a remote device, e.g., a personal computer, for further processing, recording, and/or display purposes.

It will be appreciated that other optically-sensible markings could be used on a roller for indicating its rotary movements, and thereby the instantaenous position of the scanner. For example, the roller may be marked with helical grooves rather than printed lines, or with black lines on a white background rather than white lines on a black background. Since the direction of scanning is automatically detected, the data processor could process only the information detected when the scanner is moved in the proper direction, and ignore the data generated when moved in the opposite direction. Also, since contact with the record medium is detected automatically, this can be used for automatically starting the read-in of data for translation, and also for automatically terminating the translation. Further, while the described rotary movement detector is particularly useful in an optical scanner as described herein, it will be appreciated that such a detector could be used in many other applications of rotary encoders in general, such as for detecting the rotation of rotary shafts and the like.

Many other variations, modifications and applications of the invention will be apparent.

What is claimed is:

1. An optical scanner comprising a hand-holdable housing including:

a scanner head for scanning a record medium;

a roller engageable with and rotatable by said record medium when scanned by said scanner head, said roller including an optically-sensible marking for use in measuring rotary movements of the roller;

a light source illuminating said roller and said marking thereof;

an optical sensor for sensing information on the record medium and the marking of the roller;

and a control system for periodically energizing said light source during predetermined time periods enabling said optical sensor to sense said marking of the roller during said predetermined time periods, and the information on the record medium during other time periods.

2. The scanner according to claim 1, wherein said housing further includes a second light source for illuminating said record medium, and said control system periodically energizes said second light source at different time periods than said first-mentioned light source.

3. The scanner according to claim 2, wherein said first-mentioned light source is energized at a frequency of over 1 KHz, and said second light source is energized at a frequency of lower than that of said first-mentioned light source.

4. The scanner according to claim 2, wherein said housing further includes a third light source for illuminating the record medium and for focussing a spot of light therefrom onto the optical sensor when the scanner head is in contact with the record medium, said control system periodically energizing said third light source at different time periods than said first-mentioned light source and said second light source, and at a lower frequency than said second light source.

5. The scanner according to claim 1, wherein: said optical sensor includes a linear array of optical sensor elements extending parallel to the direction of rotation of the roller; and said optically-sensible marking includes at least one line extending helically on the outer face of said roller.

6. The scanner according to claim 5, wherein said marking includes a plurality of lines each extending helically for a fraction of the outer face of said roller and equally spaced from each other circumferentially of said roller.

7. The scanner according to claim 6, wherein said plurality of lines are carried by a first section at one end of the roller, said roller including a second section at the opposite end marked with a single line extending helically around said section.

8. The scanner according to claim 5, wherein said housing further includes a second roller engageable with and rotatable by the record medium when scanned by said scanner head, said second roller being mounted for rotation about a rotary axis perpendicular to the rotary axis of the first-mentioned roller and also including at least one optically-sensible line extending helically on the outer face thereof to reflect the light therefrom to said array of optical sensor elements such that the two rollers track the movements of the scanner head along two orthogonal axes.

9. The scanner according to claim 1, wherein said housing further includes a storage device for storing a dictionary of words and their translations, a visual display, and a data processor for processing the electrical signals from the optical sensor, for recognizing words therefrom corresponding to words stored in said storage device, and for displaying translations in said visual display.

10. The scanner according to claim 9, wherein: said housing further includes a microphone and a speaker; and said data processor includes further means for processing electrical signals from said microphone, for recognizing words therefrom corresponding to words stored in said storage device, and for reproducing their translations in said speaker.

11. The scanner according to claim 1, wherein said optical sensor includes:

an array of optical sensor elements;

a first optical system including a focussing lens for focussing onto said array of optical sensor elements light reflected from said record medium;

and a second optical system including said focussing lens of the first optical system for focussing onto said array of optical sensor elements light reflected from said roller.

12. A hand-holdable optical scanner, comprising:

a scanner head for scanning a record medium to read information therefrom;

a roller engageable with and rotatable by said record medium when scanned by said scanner head, said roller including an optically-sensible marking indicating the rotary movements of the roller and thereby the displacement of said scanner head;

a light source for illuminating said roller;

an optical sensor for sensing light reflected from said record medium and light reflected from said roller;

a first optical system having a focussing lens for focussing onto said optical sensor light reflected from said record medium;

and a second optical system including said focussing lens of the first optical system for focussing onto said optical sensor light reflected from said roller.

13. The scanner according to claim 12, wherein: said optical sensor includes a linear array of optical sensor elements extending parallel to the direction of rotation of the roller; and said optically-sensible marking includes at least one line extending helically on the outer face of said roller.

14. The scanner according to claim 13, wherein said first optical system focusses light reflected from said record medium on some of said linear array of optical sensor elements, and said second optical system focusses light reflected from said roller on others of said linear array of optical sensor elements.

15. The scanner according to claim 12, wherein said scanner further includes a second light source for illuminating said record medium, and a control system for periodically energizing said first-mentioned light source during predetermined times, and said second light source during other predetermined times, to enable said optical sensor to sense both the information on the record medium and the marking of the roller.

16. The scanner according to claim 12, wherein said housing further includes a storage device for storing a dictionary of words and their translations, a visual display, and a data processor for processing the electrical signals from the optical sensor, for recognizing words therefrom corresponding to words stored in said storage device, and for displaying translations in said visual display.

17. The scanner according to claim 16, wherein: said housing further includes a microphone and a speaker; and said data processor includes further means for processing electrical signals from said microphone, for recognizing words therefrom corresponding to words stored in said storage device, and for reproducing their translations in said speaker.

18. A detector for detecting rotary movements of a rotary member about a rotary axis, comprising:

a linear array of optical sensor elements extending parallel to said rotary axis of the rotary member;

a light source for illuminating the outer surface of said rotary member; and an optically-sensible marking including at least one line extending helically on the outer face of said rotary member.

19. The detector according to claims 18, wherein said marking includes a plurality of lines extending each helically for a fraction of the circumference of the outer face of said rotary member and equally spaced from each other circumferentially of said rotary member.

20. The detector according to claim 19, wherein said plurality of lines are carried by a first section at one end of said rotary member, said rotary member including a second section at the opposite end marked with a single line extending helically around said section.

21. The detector according to claim 18, wherein said rotary member is a roller engageable with and rollable along the surface of an object to track the rotary movements of the roller with respect to said object.

22. The detector according to claim 21, wherein said roller is included in an optical scanner having a scanner head, and said object is a record medium to be scanned by said scanner head.

23. The detector according to claim 22, wherein said scanner further includes a light source for illuminating said roller and said marking thereof, and a control system for periodically energizing said light source during predetermined time periods enabling said optical sensor elements to sense the rotary-position marking of the roller during said predetermined time periods, and the information on the record medium during other time periods.

24. The detector according to claim 23, wherein said scanner head includes a second light source for illuminating said record medium, and said control system periodically energizes said second light source at different time periods than said first-mentioned light source.

25. The detector according to claim 24, wherein said scanner head includes a common lens for focussing the light both from said record medium and from said roller onto said optical sensor.

26. The detector according to claim 24, wherein said scanner head includes a third light source for illuminating the record medium and for focussing a spot of light therefrom onto the optical sensor when the scanner head is in contact with the record medium, said control system periodically energizing said third light source at different time periods than said first-mentioned light source and said second light source.

* * * * *